United States Patent
Woolford et al.

(10) Patent No.: US 11,181,053 B2
(45) Date of Patent: Nov. 23, 2021

(54) CONTROL METHOD AND RELATED SYSTEM FOR ENGINE OPERATION

(71) Applicant: ORBITAL AUSTRALIA PTY LTD, Balcatta (AU)

(72) Inventors: Richard Albert George Woolford, Connolly (AU); John Howard Tubb, Bedfordale (AU); Callan Murray Bleechmore, Vancouver (CA)

(73) Assignee: ORBITAL AUSTRALIA PTY LTD, Balcatta (AU)

( * ) Notice: Subject to any disclaimer, the term of this patent is extended or adjusted under 35 U.S.C. 154(b) by 0 days.

(21) Appl. No.: 16/229,740

(22) Filed: Dec. 21, 2018

(65) Prior Publication Data
US 2019/0195147 A1 Jun. 27, 2019

(30) Foreign Application Priority Data
Dec. 21, 2017 (AU) .................................. 2017905134

(51) Int. Cl.
*F02D 31/00* (2006.01)
*F02D 41/14* (2006.01)
*F02D 29/02* (2006.01)
*B64D 31/06* (2006.01)
*F02D 41/22* (2006.01)
*F02D 41/30* (2006.01)

(52) U.S. Cl.
CPC .......... *F02D 31/001* (2013.01); *B64D 31/06* (2013.01); *F02D 29/02* (2013.01); *F02D 41/22* (2013.01); *F02D 41/1497* (2013.01); *F02D 41/3011* (2013.01); *F02D 2041/227* (2013.01); *F02D 2200/101* (2013.01); *F02D 2400/04* (2013.01)

(58) Field of Classification Search
CPC .............. F02D 41/0002; F02D 31/002; F02D 31/0006; F02D 2200/101; F02D 2200/501; F02D 2400/04; F02D 2041/227; F02D 29/02; B64D 31/00; B64D 31/06; B64C 39/024; B64C 2201/00; B64C 2201/044; B64C 2201/146; Y02T 10/42
USPC .......................................... 123/331; 701/110
See application file for complete search history.

(56) References Cited

U.S. PATENT DOCUMENTS

| | | | |
|---|---|---|---|
| 5,389,051 A * | 2/1995 | Hirate | F02D 31/006 477/107 |
| 9,187,182 B2 * | 11/2015 | Cathcart | B64D 31/06 |
| 9,278,698 B2 * | 3/2016 | Nagashima | B60K 26/02 |

(Continued)

*Primary Examiner* — Michael A Kessler
(74) *Attorney, Agent, or Firm* — Harness, Dickey & Pierce, P.L.C.

(57) ABSTRACT

A method and system for controlling operation of an internal combustion engine of a vehicle (such as a remotely operable unmanned aerial vehicle) to perform or implement a control strategy for controlling operation of the engine. The method and system comprises providing first and second modes optionally available for operating the engine, and changing operation of the engine from the first mode of operation to the second mode of operation following a determination that a characteristic of the operation of the engine (such as engine speed) has been requested to be modified to beyond a predetermined threshold or level. The method and system further comprises reverting control of operation of the engine from the second mode to the first mode once the requested characteristic is no longer beyond the predetermined threshold or level.

21 Claims, 5 Drawing Sheets

(56) References Cited

U.S. PATENT DOCUMENTS

2003/0154777 A1\* 8/2003 Worth ..................... G01F 1/86
73/114.34
2011/0297463 A1\* 12/2011 Grajkowski ........... B60K 26/04
180/54.1

\* cited by examiner

CONTROL METHOD AND RELATED SYSTEM FOR ENGINE OPERATION

TECHNICAL FIELD

This invention relates to operation of an internal combustion engine.

The invention is particularly applicable to operation of an internal combustion engine of an unmanned aerial vehicle (UAV). Accordingly, it will be convenient to hereinafter disclose the invention in relation to that exemplary application. However, it is to be appreciated that the invention is not limited to that application and may be used in other applications requiring the operation of an internal combustion engine of some form.

BACKGROUND ART

Discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Internal combustion engines are used in a wide variety of applications, such as in powered vehicles such as for example, UAVs. In operation of the engine, it may be important to be able to govern or limit the rotational speed of the engine under certain circumstances. The limitation to engine speed may be represented by a maximum permissible engine speed, a minimum permissible engine speed, a permissible engine speed range, or any combination thereof.

As an example, a requirement to limit engine speed may arise in order to protect an engine from damage which could be sustained during overly high speed operation, or to limit the overall speed of the vehicle or craft being powered by the engine. As a further example, there may be a requirement to limit engine speed when the engine is operating under certain conditions, such as in a "limp home mode". As a still further example, there may be a requirement to limit engine speed according to varying conditions to which the engine might be exposed during operation, such a varying barometric pressure (atmospheric pressure) arising through variations in altitude.

UAVs represent one particular engine application where speed limiting may be desirable so as to control engine speed to a level lower than a desired threshold maximum speed limit or capability of the engine. Such speed limiting may be particularly applicable where over speeding of the engine could serve to compromise the engine componentry, the condition of the UAV, and or the operation of any payload (for example, electronic sensors, camera equipment and the like) carried by the UAV (the operation of which are usually mission specific).

In recent times, mechanical devices such as governors have been used, and developments in the electronic control of engines have resulted in a greater ability to govern or limit the speed of internal combustion engines. For example, in one such development, it has been proposed to prevent further increases in, for example, rotational speed once the engine has reached a pre-set limit by skipping combustion events. In such a method, typically, an ignition event is simply not scheduled for a particular engine cylinder, and a corresponding combustion event does not occur. This method, however, has the disadvantage that fuel is still delivered into the combustion chamber, and typically passes out through the engine exhaust system into the environment unburnt. This is both a significant waste of fuel and harmful to the environment. Additionally, residual unburnt fuel can remain in the combustion chamber and adversely affect the following combustion event by reducing the predictability and certainty with regard to the amount of fuel which will be combusted.

Furthermore, seeking to limit engine speed by simply cutting combustion events (i.e. whether by not scheduling expected fuel delivery and/or ignition events) for single cylinder engines typically results in significant torque reversals and causes a coarse/significant drop in RPM, resulting in large variations in engine speeds. These torque reversals also cause undesirable vibration to be passed on to the vehicle via the engine mount system and are preferably avoided where possible.

Thus, with the view to avoiding the prospective problems of existing engine speed limiting solutions, new and improved solutions are always sought. Accordingly, it is against this background that the embodiments described herein have been developed.

SUMMARY OF INVENTION

According to a first aspect, there is provided a method of controlling operation of an internal combustion engine, the method comprising:

providing first and second modes optionally available for operating the engine;

changing operation of the engine from the first mode of operation to the second mode of operation following a determination that a characteristic of the operation of the engine has been requested to be modified to beyond a predetermined threshold or level.

Preferably, the method further comprises reverting control of operation of the engine from the second mode to the first mode once the requested characteristic is no longer beyond the predetermined threshold or level.

The method according to the invention may perform or implement a control strategy for controlling operation of the engine.

In the context of the present disclosure, it is to be understood that any characteristic of operation of the engine being set to a level beyond a predetermined threshold is a level that is above or below the predetermined threshold, or one within a range that is beyond or outside of a range or level that is considered to be acceptable for operational purposes.

The characteristic of the operation of the engine subject of the request (either directly or indirectly) may comprise the output engine speed of the engine (generally measured in revolutions per minute (or RPM)).

With an internal combustion engine, engine speed can be selectively increased or decreased as required by control of intake fluid (intake air or air/fuel mixture) delivered to combustion chamber(s) of the engine. The control of the intake fluid is commonly effected by way of a throttle, with the angular position of a throttle valve regulating flow by varying the extent of restriction to flow presented by the throttle valve.

In practical terms, an operator requests a throttle position (or throttle angle) that would normally result in a particular output engine speed for the engine. With the present invention, if that particular output engine speed is beyond a predetermined engine speed threshold or level, the operator request is effectively denied and a control strategy positions the throttle so as to maintain the output engine speed at a target engine speed which may be at or close to the predetermined engine speed threshold or level.

Optionally, the predetermined engine speed threshold or level corresponds with a maximum output engine speed considered desirable or appropriate for safe operation of the engine.

Optionally, the output engine speed is controlled by way of the operation of the throttle.

The request that a characteristic of the operation of the engine be modified may be made by way of a flight control system. With this arrangement, the engine is permitted to operate in the first mode with the characteristic of operation (e.g. output engine speed) requested by the flight control system if the request complies with the predetermined threshold or level. The engine is caused to operate in the second mode (instead of the first mode) if the request would result in a change which is beyond the predetermined threshold or level.

Optionally, the output engine speed is controlled by way of a position of the throttle, the position of the throttle being controllable by way of:
(i) a first controller external (or remote) of the engine, and/or,
(ii) a second controller local to the engine.

Optionally, the first and second controllers are arranged in communication with an electronic control unit (ECU) of the engine.

In this arrangement, the first and second controllers in conjunction with the ECU constitute the flight control system, whereby in the second mode the ECU limits the authority of the second controller to cause a change which is beyond the predetermined threshold or level. In practical terms, the ECU limits the authority of the second controller to move the throttle to bring about a change which is beyond the predetermined threshold or level.

Optionally, the ECU is appropriately programmed or configured to implement any embodiment of the control strategies described herein.

Optionally, the ECU is arranged in communication with the throttle. In this manner, appropriate command signals are sent to the throttle (e.g. requesting desired throttle positions) from the ECU. Desired throttle positions may be derived from the first and/or second controllers.

Optionally, the ECU is arranged with the second controller in a 'closed loop' configuration for operation when any of the control strategies as described herein are performed.

Optionally, the first controller communicates with the ECU via a wireless communication protocol.

Optionally, the first controller is provided with an interface operable by a user or operator.

Optionally, the user or operator of the engine is remote from the engine. For example, the engine may be one configured for use with an unmanned aerial vehicle (UAV), and therefore under the control of an operator (or user) based at a location remote from the UAV.

Optionally, the interface is configured for receiving and/or processing inputs provided by the user, any of said inputs being used to form the basis of commands corresponding to operational instructions intended for the engine (either directly or indirectly). In one embodiment, for the case where the engine is installed in an unmanned aerial vehicle (UAV), the interface is a control console configured so that the user can operate the engine of the UAV.

Optionally, the second controller is provided local to the ECU. In this manner, the second controller is, in effect, local to the engine.

Optionally, the second controller communicates with the ECU via a wired connection.

Optionally, the ECU and the second controller are configured having a dual communication pathway therebetween. In this manner, (1) signals can be relayed to the second controller from the ECU, and (2) signals can be relayed to the ECU from the second controller. In one implementation, the second controller and the ECU are configured in a 'closed loop' configuration.

Optionally, the first mode of operation of the engine (or throttle) is by way of the first controller. In this manner, the first mode of operation may encapsulate normal remote operability of the engine by way of the interface.

Optionally, the second mode of operation of the engine (or throttle) is by way of the second controller. In this manner, the second mode of operation may encapsulate control (for example, in a closed loop manner with the ECU) of the operation of the engine for a finite period, for example, following any embodiment of the control strategies or methods described herein having been actioned.

With respect to a scenario involving a limitation of engine speed to a predetermined engine speed limit, when the throttle position determined by the first controller (in response to an operator request) would result in an engine output speed which exceeds the predetermined engine speed limit, the ECU (in concert with the second controller) provides closed loop control of the throttle and maintains the engine output speed at around the engine speed limit. When the throttle position determined by the first controller (in response to an operator request) is then reduced to a requested position that is less than the prevailing position required to maintain the engine speed limit, the control of the throttle position reverts back to the first controller which then provides open loop control of the throttle position.

Optionally, the control strategy comprises causing the engine to operate at about the desired engine speed whereby engine speed control is achieved by way of appropriate modification of the position of the throttle and also modification of the fuel delivery to the engine in a manner which is independent of throttle position.

The throttle in many engine applications can be a relatively slow moving device (i.e. as compared to cylinder fueling updates effected at each engine top dead centre (TDC)). By also having an independent controller controlling fueling to the engine, a certain degree of improvement in respect of target vs actual engine speed can be achieved. The authority of fueling change requires to be strictly limited because the engine has rich and lean fueling limitations. Within these limits however, the fueling can vary independently of the throttle position base fueling request.

The control strategy may be employed during operation of the engine.

The control strategy may be used to control operation of an engine when a request is made for the engine to operate beyond a threshold engine speed.

The engine may comprise a single-cylinder engine or a multi-cylinder engine.

The engine may comprise a spark-ignition engine or a compression-ignition engine.

The engine may comprise a two-stroke or a four-stroke engine.

The engine may further comprise a fluid injector to provide a means of fluid delivery.

The engine may be fueled with any appropriate fuel, as would be understood by a person skilled in the art, including for example gasoline and heavy fuels (e.g. military fuels such as JP-5 and JP-8).

According to a second aspect of the invention there is provided a control system for an internal combustion engine, wherein the control system is operable to provide first and second modes optionally available for operating the engine, and wherein the control system comprises a first controller external (or remote) of the engine and a second controller local to the engine, the first controller being configured to request a characteristic of the operation of the engine in the first mode, the second controller being configured to interact with an electronic control unit (ECU), whereby in the second mode the ECU limits the authority of the second controller to cause a change in operation of the engine which is beyond the predetermined threshold or level.

The control system may be further operable to revert control of operation of the engine from the second mode to the first mode once the requested characteristic is no longer beyond the predetermined threshold or level.

According to a third aspect of the invention there is provided an internal combustion engine operated in accordance with a method according to the first aspect of the invention.

According to a fourth aspect of the invention there is provided an internal combustion engine having a control system according to the second aspect of the invention.

According to a fifth aspect of the invention there is provided a vehicle powered by an internal combustion engine according to the third or fourth aspect of the invention.

The vehicle according to fifth aspect of the invention may be configured as a remotely operable unmanned aerial vehicle (UAV).

According to a further aspect, there is provided a control strategy or method for managing operation of an engine, the strategy or method comprising:
    enabling a change in operation of the engine following a determination that a characteristic of operation of the engine has been requested to be modified to beyond a predetermined threshold or level.

The change may be enabled following a determination that the characteristic of operation of the engine has been requested to correspond with a threshold or level that departs from a predetermined threshold or level. Optionally, the predetermined threshold or level is one that is considered to be acceptable.

The change in operation of the engine following the determination (that the characteristic of operation of the engine has been requested to be changed to beyond the predetermined range) may comprise adjusting one or more operational characteristics of the engine to or toward respective predetermined thresholds or desired level(s).

Optionally, the change in operation of the engine following the determination (that the characteristic of operation of the engine has been requested to be changed to beyond the predetermined range) comprises adjusting the output engine speed to or toward a predetermined or desirable engine speed limit.

Optionally, the profile of the predetermined or desirable engine speed may be linear or non-linear.

Optionally, the change in operation of the engine following the determination comprises limiting the engine speed to about the predetermined or desirable engine speed limit.

Optionally, the change in operation of the engine following the determination comprises controlling the engine speed so that it does not substantially depart (exceed or otherwise) from the predetermined or desirable engine speed limit.

According to a still further aspect, there is provided a control strategy or method for managing operation of an engine, the strategy or method comprising:
    changing operational control of a characteristic of the engine to a source local to the engine due to a request, received from a source external of the engine, relating to the characteristic.

According to a still further aspect, there is provided a control strategy or method for managing operation of an engine, the strategy or method comprising:
    changing operation of the engine from a first mode of operation to a second mode of operation following a determination that a characteristic of the operation of the engine has changed or is desired to be changed by way of the first mode of operation.

According to a still further aspect, there is provided a control strategy or method for controlling operation of an engine, the strategy or method comprising:
    determining an engine speed arising from a request by an operator of the engine,
    comparing the determined engine speed with a predetermined engine speed limit,
    wherein, if the determined engine speed exceeds the predetermined engine speed limit, causing the engine to operate at about the predetermined engine speed limit.

According to a still further aspect, there is provided a system configured for implementing any embodiment of a control strategy or method arranged in accordance with the strategies or methods of the first, second, third, or fourth principal aspects, or as described herein.

According to a still further aspect, there is provided a system operably configured (existing or otherwise) for implementing any embodiment of a control strategy or method arranged in accordance with the strategies or methods of preceding aspects of the invention, or as described herein.

According to a still further aspect, there is provided an internal combustion engine, the internal combustion engine being operated in accordance with any embodiment of a control strategy or method arranged in accordance with the strategies or methods of preceding aspects of the invention, or as described herein.

According to a still further aspect, there is provided a vehicle powered by any embodiment of an internal combustion engine arranged in accordance with the internal combustion engine of the preceding aspect of the invention, or as described herein.

The vehicle may comprise an unmanned aerial vehicle (UAV).

According to a still further aspect, there is provided an engine management system operable to perform any embodiment of a control strategy or method arranged in accordance with the strategies or methods of preceding aspects of the invention, or as described herein.

Optionally, the engine management system may be operable to respond to information received by various sensors to control or adjust one or more operating parameters of the engine, including controlling operation of the fluid delivery means.

According to a still further aspect, there is provided a control strategy or method for:
    enabling an operational state of an engine by way of a control strategy or method according to any of the preceding aspects or embodiments described herein.

According to another aspect, there is provided a control strategy or method for:

maintaining enablement of an operational state of an engine enabled by way of a control strategy or method according to any of the principal aspects or embodiments described herein.

According to still further aspect, there is provided a control strategy or method for:

disabling an operational state of an engine enabled and/or maintained by way of a control strategy or method according to any of the preceding aspects of the invention or embodiments described herein.

According to another aspect, there is provided a remotely operable unmanned aerial vehicle (UAV) comprising:
(a) means for implementing an embodiment of a control strategy or method arranged in accordance with the strategies or methods of any of the preceding aspects of the invention or embodiments described herein; and/or
(b) an embodiment of an internal combustion engine arranged in accordance with the internal combustion engine of any of the preceding aspects of the invention or embodiments described herein; and/or
(c) an embodiment of an engine management system arranged in accordance with the engine management system of any of the preceding aspects of the invention or embodiments described herein.

Optionally, the remotely operable UAV may comprise any of the features described herein.

Various aspects of the invention described herein can be practiced alone or in combination with one or more of the other aspects, as will be readily appreciated by those skilled in the relevant art. The various aspects can optionally be provided in combination with one or more of the optional features described in relation to the other aspects. Furthermore, optional features described in relation to one example (or embodiment) can optionally be combined alone or together with other features in different examples or embodiments disclosed.

BRIEF DESCRIPTION OF THE DRAWINGS

Further features of the present disclosure are more fully described in the following description of several non-limiting embodiments thereof. This description is included solely for the purposes of exemplifying the principles of the present disclosure. It should not be understood as a restriction on the broad summary, disclosure or description of the embodiments described as set out above. The description will be made with reference to the accompanying drawings in which.

Figure 1:
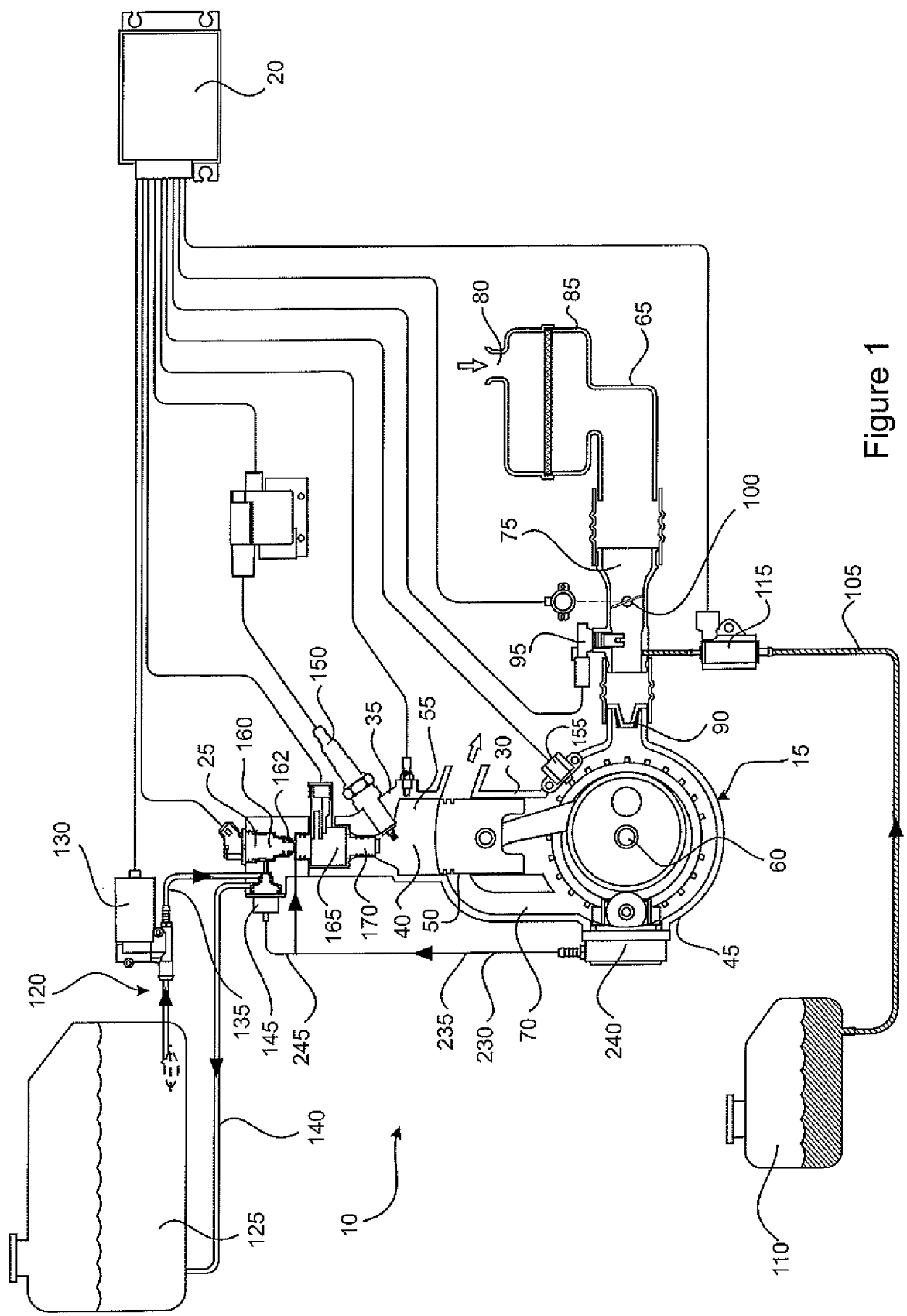
FIG. 1 is a schematic representation of an embodiment of an engine system operable in accordance with one or more embodiments of the control strategies or method(s) disclosed herein.

The drawings shown are not necessarily to scale, with emphasis instead generally being placed upon illustrating the principles of the present disclosure.

The figures depict one or more embodiments exemplifying the principles of the present disclosure. The embodiments each illustrate a certain configuration; however, it is to be appreciated that the inventive principles can be implemented by way of many different configurations, as would be obvious to a person skilled in the art, whilst still embodying any of the inventive principles. These configurations are to be considered within the embodiments described herein.

DETAILED DESCRIPTION

In the following detailed description, the present invention is described in connection with several preferred embodiments. However, to the extent that the following description is specific to a particular embodiment or a particular use of the present techniques, it is intended to be illustrative only and merely provides a concise description of the exemplary embodiment(s). Accordingly, the present disclosure is not limited to the specific embodiments described below, but rather the inventive principles include all alternatives, modifications, and equivalents falling within the true scope of the appended claims.

Embodiments will be described with reference to an internal combustion engine system 10 as shown schematically in FIG. 1. The internal combustion engine system 10 has been devised particularly for use with an unmanned aerial vehicle (UAV), although it may of course have other applications. In order to satisfy the packaging and weight requirements in relation to use with a UAV, and to also reduce complexity, the engine system 10 does not have certain components which would otherwise be expected, as will become apparent later.

The engine system 10 comprises a small, single-cylinder reciprocating piston two-stroke engine 15 operating under the control of an electronic control unit (ECU) 20. The engine 15 may be fueled with any appropriate fuel, including gasoline and heavy fuels (e.g. military fuels such as JP-5 and JP-8).

The engine system 10 further comprises a dual-fluid direct injection system 25 facilitating a gas-assist fuel delivery process. In the embodiments to be described, the gas comprises air thereby providing an air-assist fuel delivery process wherein fuel entrained in the air is delivered directly into a combustion chamber of the engine 15.

The engine 15 comprises an engine block 30 and a cylinder head 35 which together define a cylinder 40 and a crankcase 45. A piston 50 is accommodated in the cylinder 40. The cylinder 40 and the piston 50 cooperate to define the combustion chamber 55.

The piston 50 is connected to a crankshaft 60 rotatably supported within the crankcase 45 in a known manner.

An air intake system 65 is provided to deliver combustion air into the crankcase 45 for delivery into the combustion chamber 55 by crankcase compression via transfer port 70. The air intake system 65 includes an air intake path 75 extending between an intake end 80 incorporating an air filter 85, and an outlet end 90 opening into the crankcase 45. The air intake path 75 has an air temperature sensor 95 providing signals to the ECU 20 indicative of the temperature of the air delivered to the engine 15. The air intake path 75 also has an air flow control valve 100 operable under the control of the ECU 20. It should however be noted that in other arrangements the air intake path 75 may additionally or alternatively include an air flow sensor, and that the exclusion of an air flow sensor in the current embodiment in no way limits the scope of the present disclosure.

A lubrication system 105 is provided to deliver lubricating oil into the air intake path 75 for entrainment in intake air flow into the crankcase 45. The lubrication system 105 includes an oil reservoir 110 and an oil pump 115 which is operable under the control of the ECU 20. It should however be noted that in other arrangements the lubrication system 105 may be arranged to deliver lubricating oil directly to specific parts of the engine 15 without passing through the inlet throttle tract (e.g. such as directly to the cylinder 40 and/or a main engine bearing) and that any reference to oil being delivered into the air intake path 75 in the current embodiment in no way limits the scope of the present disclosure.

A fuel supply system 120 is provided to deliver fuel to the dual-fluid direct injection system 25. The fuel supply system 120 includes a fuel reservoir 125 and an electrical fuel pump 130 which is operable under the control of the ECU 20. The fuel supply system 120 further includes a fuel supply line 135 adapted to receive fuel from the fuel reservoir 125 and to deliver it to the dual-fluid direct injection system 25, and a fuel return line 140 to return excess liquid fuel to the fuel reservoir 125 in a known manner. The fuel pump 130 is associated with the fuel supply line 135. The fuel supply system 120 also includes a fuel pressure regulator 145 for regulating the fuel pressure against air pressure in the dual-fluid direct injection system 25, as would be understood by the skilled reader.

An ignition system 150 is provided for igniting a combustible mixture within the combustion chamber 55. The ignition system 150 is operable under the control of the ECU 20.

A sensor 155 is operably arranged to provide signals to the ECU 20 indicative of the speed and rotational position of the crankshaft 60.

The dual-fluid direct injection system 25 facilitating the air-assist fuel delivery process comprises a fuel metering device 160 and a fluid delivery device 165 (shown schematically in FIG. 2) operating in tandem. Fuel received from the fuel metering device 160 is delivered into a mixing zone 180 for mixing with air received from a pressurised supply to provide an air-fuel mixture for injection by the fluid delivery device 165 into the combustion chamber 55. In the arrangement shown, the fuel metering device 160 comprises a fuel injector 162, and the fluid delivery device 165 comprises a fluid delivery injector 170. The pressure of fuel supplied to the fuel metering device 160 is controlled by the fuel pressure regulator 145, as alluded to above.

Figure 2:
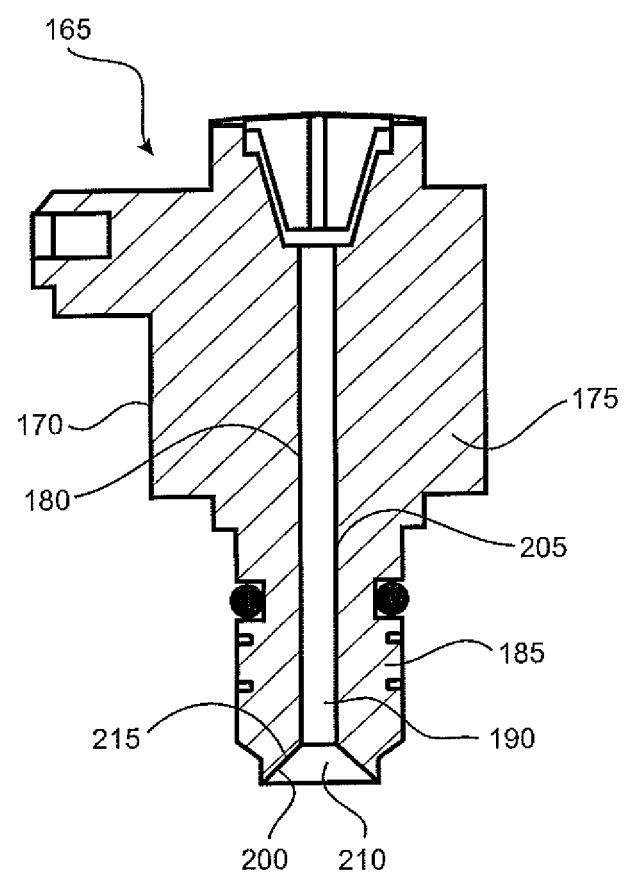
FIG. 2 is a schematic cross-sectional view of one embodiment of a fluid delivery device used with the engine system shown in FIG. 1.

With reference to FIG. 2, the fluid delivery device 165 includes a main body 175 having a nozzle portion 185 communicating with the combustion chamber 55. The mixing zone 180 is effectively provided within the nozzle portion 185 at the lower end of the fluid delivery device 165. The fluid delivery device 165 further includes an electronically-operable (solenoid) delivery valve 190 associated with the nozzle portion 185. The delivery valve 190 is operable in a known manner to open and close a valve port 200 in the nozzle portion 185 to control delivery of the air-fuel mixture through the delivery valve 190 into the combustion chamber 55. In the arrangement shown, the delivery valve 190 is in the form of a poppet valve comprising a valve stem 205, and a valve head 210 which cooperates with a valve seat 215 formed in the nozzle portion 185 to define the valve port 200.

The delivery valve 190 and its associated features (including valve stem 205, valve head 210, valve seat 215 and valve port 200) are depicted schematically in FIG. 2 for illustrative purposes only. It should, however, be understood that the delivery valve 190 may take any other appropriate form as would be understood by a person skilled in the art (including one where the valve stem 205 may be of hollow construction to enable the flow of the air-fuel mixture along a portion of the valve stem).

The fuel metering device 160 and the fluid delivery device 165 are each operable in response to control signals received from the ECU 20. The operation of each device 160, 165 is controlled in terms of the timing of opening and the duration of opening thereof in a regime determined by the ECU 20.

A gas supply system 230 (shown in FIG. 1) is provided to supply pressurised air to the dual-fluid direct injection system 25. More particularly, the gas supply system 230 is operable to supply air under pressure to the fluid delivery device 165, where on opening of the fluid delivery device 165 pressurised air can flow through the fluid delivery device 165 and be delivered into the combustion chamber 55. The pressurised air communicates with the mixing zone 180, and when the fluid delivery device 165 is opened, any fuel delivered into the mixing zone 180 by the fuel metering device 160 is entrained by the pressurised air and delivered through the valve port 200 into the combustion chamber 55.

The gas supply system 230 comprises an air flow line 235 extending between an air compressor 240 and the fluid delivery device 165. The air compressor 240 is driven mechanically by the engine 15 and as such operates independently of the ECU 20; that is, the air compressor 240 is not controlled by the ECU. In the arrangement shown, the air compressor 240 receives intake air from the air intake system 65 via the crankcase 45; that is, the intake of the air compressor 240 is in communication with the crankcase 45 to receive intake air for compression.

The fuel pressure regulator 145 is in communication with the gas supply system 230, as shown in FIG. 1. More particularly, the fuel pressure regulator 145 is in communication with air flow line 235 via branch line 245.

The ECU 20 is configured to be responsive to information received by various sensors by controlling and/or adjusting one or more operating parameters of the engine system 10. The ECU 20 includes a timing means (not shown) such as a counter operable to delay initiation of certain of the operating parameters of the engine system 10 for a prescribed time duration.

The engine 15 arrangement shown is adapted to be cranked for start-up by an external torque drive releasably coupled to the engine crankshaft 60. Further, electrical energy for operating various engine components and systems (such as the ECU 20, the electrical fuel pump 130, the ignition system 150, the fuel metering device 160, and the fluid delivery device 165) is generated by a generator (not shown) mechanically coupled to the engine 15 and operable upon cranking and subsequent running of the engine. The engine 15 may however be configured to include a battery and starter-motor system and the exclusion of these elements in the current embodiment in no way limits the scope of the present disclosure.

In the context of the engine being used as a means of propulsion for a remotely operated UAV, it is often the case that the engine output is determined via a throttle position that is controlled via an external flight controller; the flight controller acknowledging and processing high level control inputs from a human operator. In these circumstances, there is merit in the ultimate output speed (i.e. revolutions per minute (RPM)) of the engine being appropriately governed in order to mitigate (or avoid, to the extent possible) any risk of damage (for example, mechanical damage) occurring to the engine 15.

Figure 3:
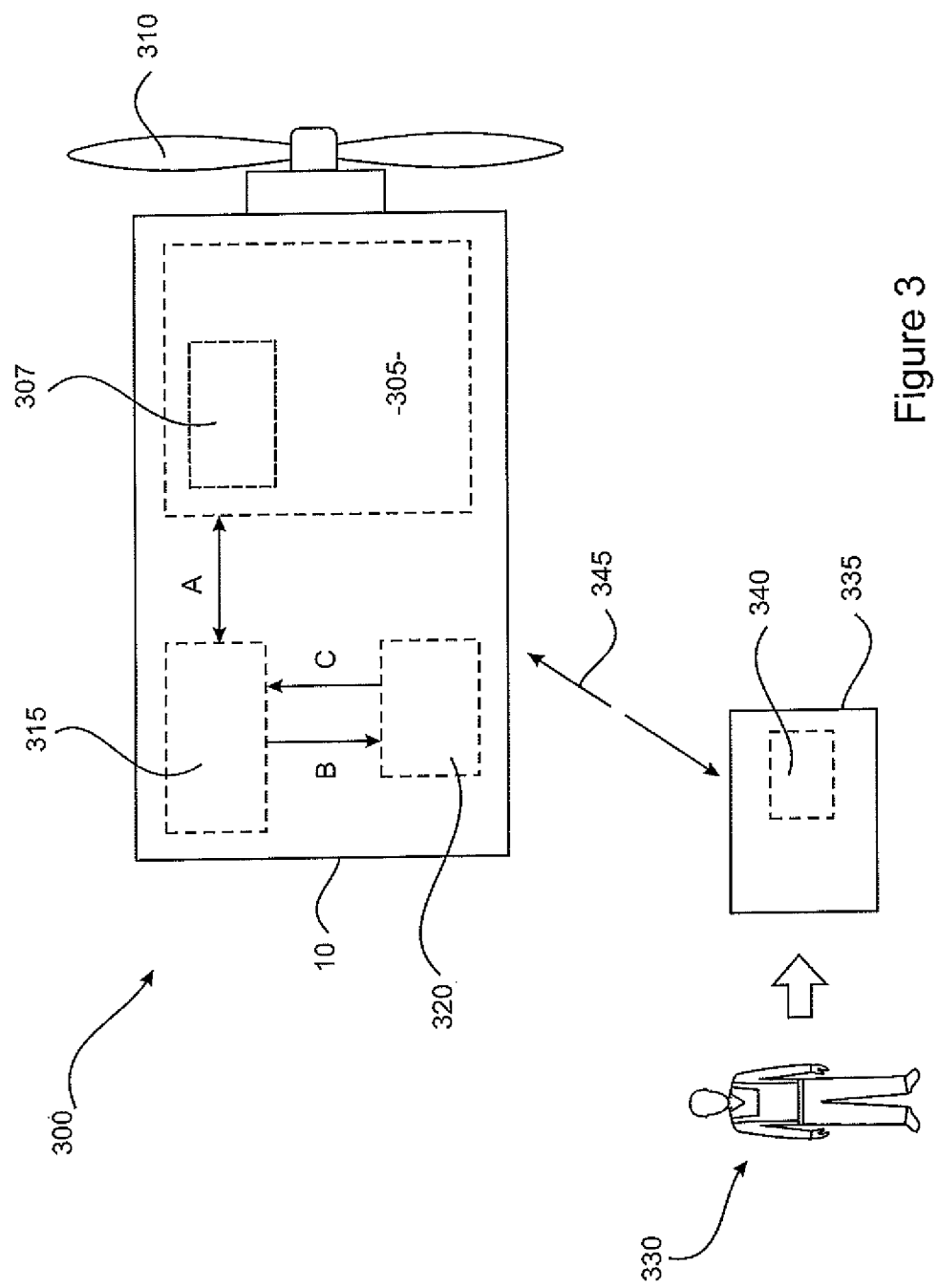
FIG. 3 provides a schematic representation of one embodiment of operational control of a UAV configured to include one embodiment of the control strategy or method described herein.

One embodiment of a typical operational overview of a UAV 300 is shown in FIG. 3. The UAV comprises an engine 305 (which effectively corresponds to the engine 15 depicted in FIG. 1) having a throttle 307 (which effectively corresponds to the air flow control valve 100 depicted in FIG. 1) and arranged to drive a propulsion element provided in the form of a propeller 310. The UAV further comprises an ECU 315 (which effectively corresponds to the ECU 20 depicted in FIG. 1) which is configured to, at least in part, send appropriate signals to the throttle 307 of the engine 305 for controlling operation thereof by way of communication pathway A. The UAV 300 further comprises a local controller 320 (effectively an on-board flight controller) which is configured in communication with the ECU by way of communication pathways B (from ECU 315 to local controller 320) and C (from local controller 320 to ECU 315) so as to be capable of controlling the throttle position of the throttle 307 of the engine 305 when certain conditions are met.

In the embodiment described herein, the UAV 300 is configured to be remotely operable by a remote user 330 by way of an interface module 335. The interface module 335 comprises an external controller 340 which is configured to receive inputs from the user 330 for processing and transmittal to the ECU 315 of the UAV 300 via the local controller 320. As the skilled reader would appreciate, transmittal of the remote operational commands/signals (for control/operation of the UAV) is by way of wireless transmission 345. It is notable that requests from the external controller 340 are passed through the ECU 315 via the local controller 320. In this way, the ECU 315 can intercept a request from the external controller 340 where required and limit the authority of the local controller 320 to control the operation of the engine 305, 15. Actual throttle settings are thereafter implemented by a throttle position controller (not shown) which may comprise a servo motor operating under the control of an electronic throttle control module in known manner in communication with or integrated into the ECU 315.

Under certain engine operating conditions or in certain circumstances, operation of the engine 305 may require the rotational speed of the engine 305 to be governed or limited by the ECU 315. For example, a requirement to limit the engine speed may arise in order to protect the engine 305 from damage which could be sustained during overly high speed operation, or to simply limit the overall speed of the UAV 300. Over speeding of the engine 305 could, for example, serve to compromise engine componentry, the condition of the UAV 300, and or the operation of any payload carried by the UAV (for example, electronic sensors, camera equipment and the like). Means to minimise or manage the risk associated with such over speeding are hence highly desirable to ensure safe and ongoing satisfactory operation of the engine 305 and UAV 300.

Known means of managing such engine over speed risks are typically by way of managing the engine output by specifically limiting the RPM by spoiling or wasting generated engine torque by trailing off the engine output by affirmative control of the injection or ignition timings, or by reducing fueling at a specific or relevant throttle position. However, each of these techniques have the flow-on effect of increasing exhaust temperatures (which is undesirable). Furthermore, in the case of reducing or limiting fueling, a key disadvantage is that the throttle (and therefore the airflow to the engine) remains in the control of the external flight controller; which could undesirably impact the prevailing air-fuel ratio and hence the operational stability of the engine.

A further technique for managing such engine over speed risks is to affirmatively cease engine cylinder events to prevent over-speeding of the engine. This approach can however, disadvantageously, result in sudden torque reversals—this particularly being likely for single or twin cylinder engines.

The present embodiments are directed to example methods of operating an engine system 10 in accordance with a control strategy (hereinafter, control strategy) for managing operation of an internal combustion engine (15) whereby a change in operation of the engine is enabled following a determination that a characteristic of the operation of the engine (such as for example the output engine speed) has been requested to be modified to beyond a predetermined threshold (range or value).

In one exemplification of the control strategy, the operational characteristic concerned is the engine's output speed (i.e. the engine's RPM) which is governed by the engine's 305 throttle position. In this circumstance, for example, once it is determined that a requested change—sought by the operator 330 by way of interface 335 (and transmitted by way of external controller 340)—results or will result in an RPM value that is beyond the predetermined threshold, the ECU 315 and the local controller 320 (serving as a closed loop throttle position controller local to the ECU 315 of the engine 300) become operational so as to maintain the ultimate engine speed at a desired (or target) engine speed; thereby affirmatively seeking to prevent excessive engine speed regardless of any such request sent by the external controller 340. In this embodiment, the desired (or target) engine speed may correspond to a maximum allowable engine speed considered appropriate for desired (e.g. safe) operation of the engine 305, 15. The maximum allowable engine speed may also correspond to the predetermined threshold engine speed that governs the point at which closed loop control via the ECU 315 (in concert with the local controller 320) takes over control of the throttle position.

During normal operation of the UAV 300, the user 330 inputs operation commands using interface 335. In this manner, operation of the engine output is generally determined by the commands received by the ECU 315, 20 by way of the interface 335. However, in order to prevent the engine 305 undertaking an action which could result in mechanical damage, the ECU 315 and the local controller 320 are configured so as to be operable when a command is received by way of the interface 335 that would ordinarily require the engine to operate in an undesirable manner. For example, the remote user 330 could request or demand an operational characteristic that results in the output speed of the engine being above a desirable level or limit—a level or limit that is known (or otherwise) to be capable of causing mechanical damage to one or more elements of the UAV 300; for example, the engine 305, 15. To prevent such action occurring the ECU 315 and the local controller 320 are configured operable for carrying out the control strategy described herein thereby seeking to enable a change in operation of the engine 305 following the determination that the output engine speed has been requested to be modified to a level beyond (in this instance, above) a predetermined desirable level.

While the external controller 340 sustains any request for an engine speed which is beyond or above the predetermined range, the control strategy continues to be invoked and operation of local closed loop throttle position control is maintained serving to actively control (or limit) the engine's (305) output speed to the desirable engine speed.

The control strategy is then disabled once the external controller 340 requests that the ECU 315 change the engine speed to one that is within or below the predetermined threshold range or value. In this event, local closed loop throttle position control ceases and active control of the throttle position is returned (or reverts) to the external controller 340 (i.e. which effectively provides open loop control of engine speed). Thus, the engine output speed changes from the desirable engine speed to that requested by the external controller 340 (which, in the case of disablement of the control strategy) will in practice be lower than the desirable engine speed.

Figure 4:
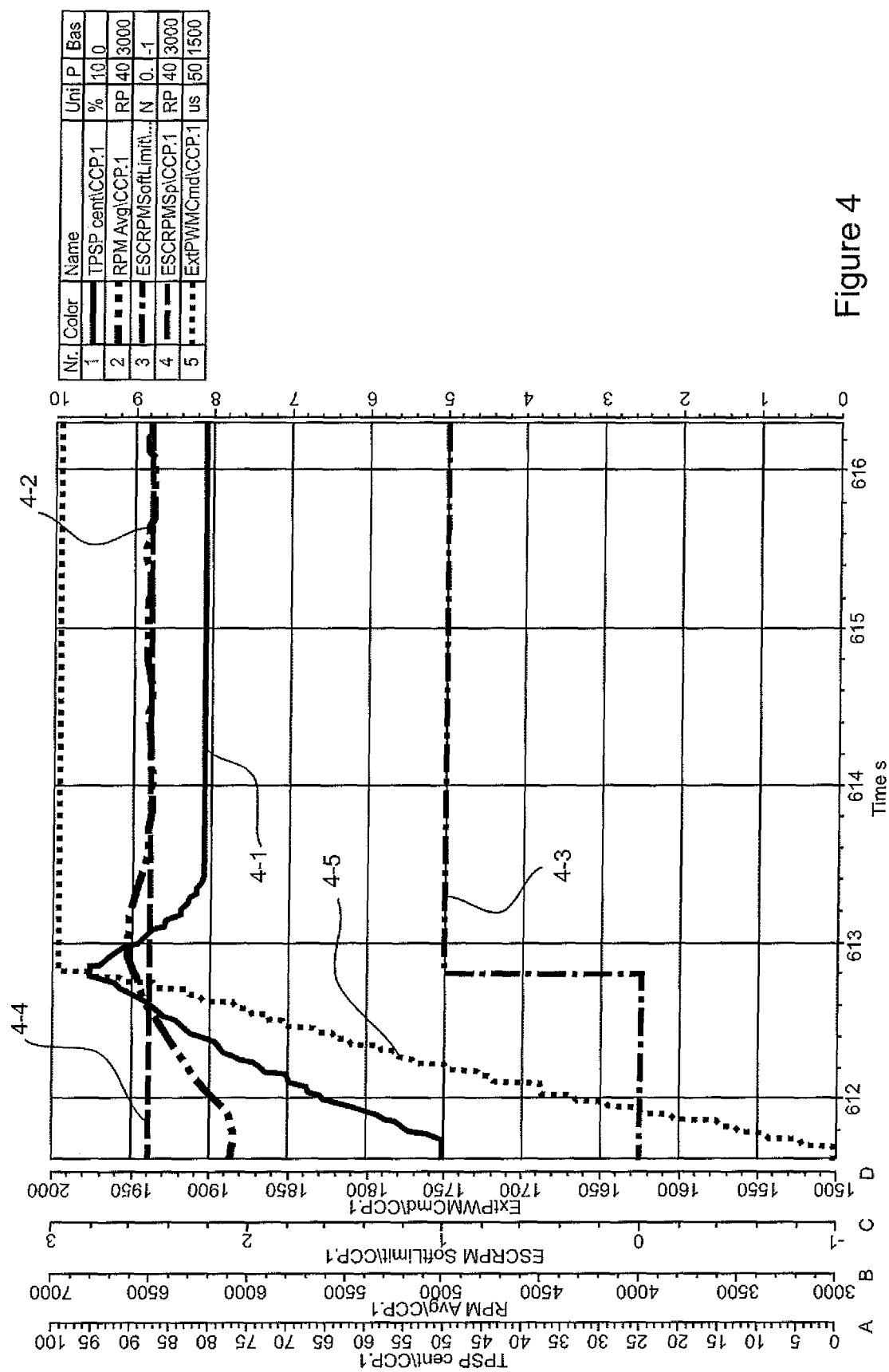
FIG. 4 shows a graphical representation of ECU data corresponding to the enablement of one embodiment of the control strategy or method described herein.
Figure 5:
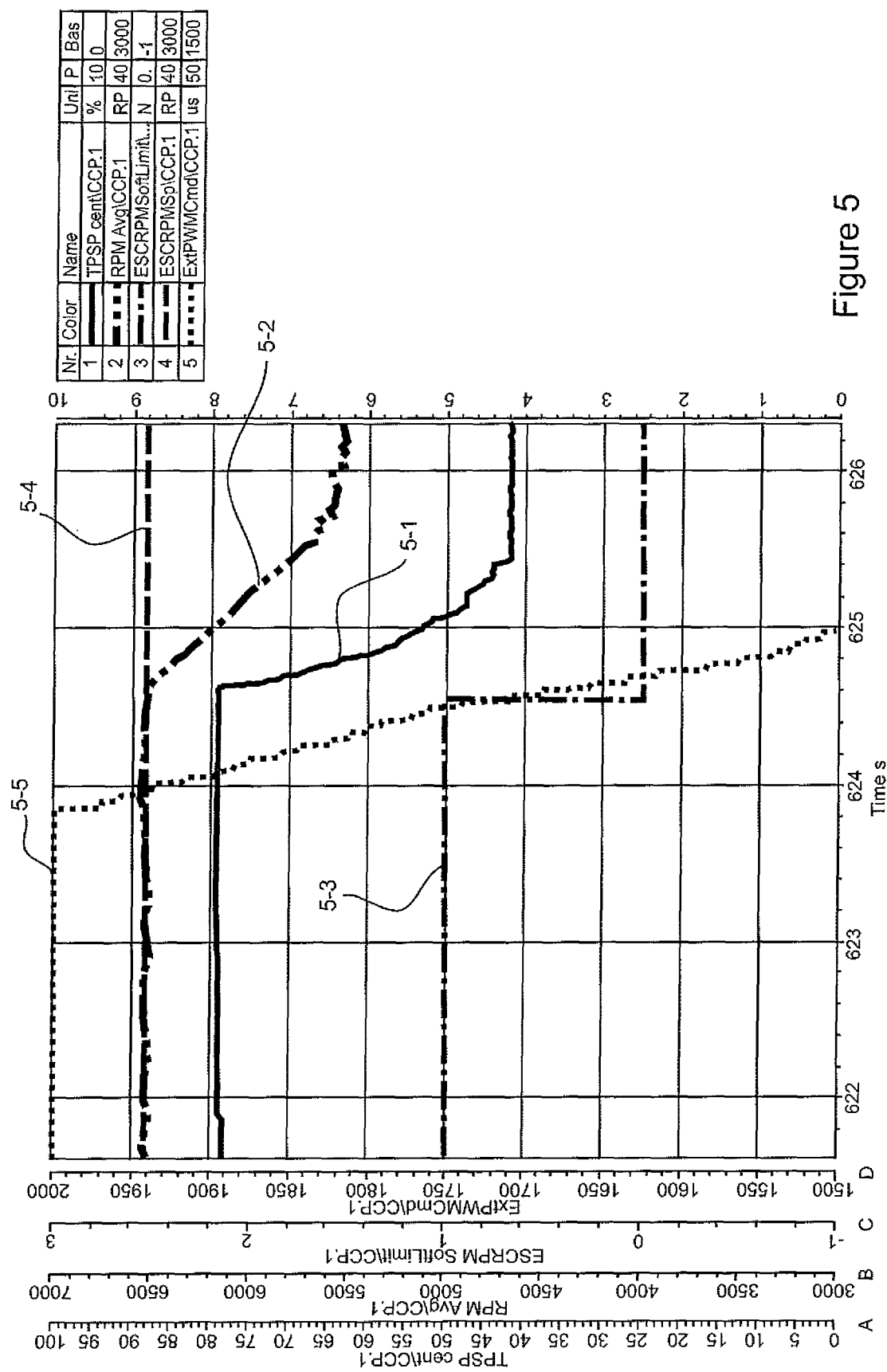
FIG. 5 shows a graphical representation of ECU data corresponding to disablement of the control strategy or method exemplified by similar ECU data shown in FIG. 4.

FIG. 4 and FIG. 5 both show data from a simulation of the operation of an ECU (like ECU 315, 20). FIG. 4 shows a first example case where, broadly, the control strategy is enabled following a request from the external controller (340) to increase the engine output speed. FIG. 5 shows a second example case where, again broadly, the control strategy is disabled from an enabled state.

With specific regard to the enablement case shown in FIG. 4, the following parameters are tracked over the period of operation shown:
- 4-1: the throttle level (as a percentage; 0-100%);
- 4-2: engine crankshaft speed;
- 4-3: this parameter steps high when the control strategy is enabled;
- 4-4: this parameter represents the target engine speed that is pursued when the control strategy is enabled; and
- 4-5: this parameter represents the command from the flight controller (typically 1,000 µs to 2,000 µs, which corresponds to 0% throttle level and 100% throttle level at which point the ECU 315 via closed loop throttle control has direct control of throttle position).

As shown, once the control strategy is enabled (parameter 4-3, steps high) the throttle position control is no longer directly controlled via the external flight controller 340 signal (parameter 4-5) and is instead varied by the control strategy to maintain a target engine speed. It can be seen that as the throttle opens the engine speed begins to exceed the speed (RPM) (plus a hysteresis) as the throttle % approaches 95%. The ECU 315 (in concert with the local controller 320) then reduces the throttle percent (4-1) in order to maintain the engine speed at the desired level. Note that the external controller 340 request (4-5) continues to request/demand a throttle position higher than that needed to maintain the desired engine speed limit. The ECU 315 reduces the throttle position (4-1) from ~95% to ~80% when the control strategy is enabled. Hence open loop control of the throttle from the external controller has reverted to closed loop control of the throttle via the ECU 315 (in concert with the local controller 320).

With specific regard to the disablement case shown in FIG. 5, the following parameters are tracked over the period of operation shown:
- 5-1: the throttle level (as a percentage; 0-100%);
- 5-2: engine crankshaft speed;
- 5-3: this parameter steps low when the control strategy is disabled (steps high when control strategy is enabled);
- 5-4: this parameter represents the target engine speed that is pursued when the control strategy is enabled; and
- 5-5: this parameter represents the command from the flight controller (typically 1,000 µs to 2,000 µs, which corresponds to 0% throttle level and 100% throttle level at which point the ECU 315 via closed loop control has direct control of throttle position).

The control strategy disables when the external controller (340) commanded signal (from user 330) becomes less than the current required throttle position to hold the desirable engine speed, i.e. when the external controller 340 commanded signal (5-5) requests a throttle percent position less than the current throttle position required to hold the desirable engine speed (minus some hysteresis), then the strategy is disabled (5-3 steps low) and the engine becomes directly controlled via the external controller 340. Once the control strategy is disabled the external controller 340 signal (parameter 5-5) reduces and the throttle percent (5-1) reduces and the engine speed (5-2) reduces. Hence, closed loop control of the throttle under ECU 315 (in concert with the local controller 320) has ceased and throttle control has reverted back to the external controller 340 (i.e. which effectively provides open loop control of engine speed). In at least one example implementation, the external controller 340 signal (5-5) changes from ~2,000 µs to ~1,720 µs without any substantial effect on engine speed.

Accordingly, embodiments of the control strategy described herein are implemented to seek to prevent mechanical damage occurring to one or more components of the engine (or host vehicle) in the event an operational parameter (such as for example, engine speed) is requested (by, for example, a remote operator) to operate above or beyond a desired level. The control strategy can be disabled when the operational parameter is requested to operate below the desired level or within an acceptable range. Of course, the desired level or acceptable range can be modified as required.

In the context of the present disclosure, the control strategy or method may be implemented in many ways, as would be understood by the skilled reader. The controllers 320, 340 (and indeed the ECU 315) may comprise processing means in the form of one or more processors. The controllers 320, 340 may be configured operable under control of appropriate electronic program instructions, which program instructions may be held in appropriate storage means, such as for example, read only memory (ROM) and random access memory (RAM).

It may also be the case that program instructions are held in local controller 320 (i.e. a flight plan) which are carried out with little directional communications between external controller 340 and local controller 320. That is, controller 320 could request change in the throttle 307 position via ECU 315 without any direct request from controller 340 (e.g. in order to meet pre-determined vehicle speed or altitude requirements). By way of example, if the wind direction changes then local controller 320 may request more vehicle/UAV speed by requesting more opening of the throttle 307 (similarly if for example electrical load is being deployed/absorbed).

The interface 335 may be provided as any portable (or non-portable) device having appropriate circuitry for operation. The interface 335 also includes an operating system which is capable of issuing commands and is arranged to cause the interface 335 to carry out respective steps, functions and/or procedures in accordance with the embodiment of the invention described herein. The operating system may be appropriate for the interface 335.

In one embodiment, the operation of the engine 305 (or host UAV 300) could be by way of a communication network including, at least in part, a server (not shown). The server may be in communication with the interface 335 and comprise suitable components necessary to receive, transmit, store, and execute appropriate electronic program instructions. The components include processing means in the form of a server processor, server storage comprising read only memory (ROM) and random access memory (RAM), one or more server input/output devices such as disc drives, and an associated server user interface. Remote communications devices (including the interface 335) may be arranged as required to communicate with the server via one or more communications link(s) (not shown).

Implementations of various embodiments of the method of controlling an engine by way of a control strategy may be provided by way of appropriately configured systems and/or engine management systems for specific engine management. Similarly, implementations of the control strategy could be readily exemplified in the form of appropriately configured engines, such as internal combustion engines. Even furthermore, implementations of the control strategy (and indeed related systems and engines) could be exemplified in the form of various vehicles, such as for example, unmanned aerial vehicles (UAVs).

It is evident from the foregoing description that the method of controlling an engine provides a control strategy which may govern or limit the rotational speed of the engine under certain circumstances. The limitation to engine speed may be represented by a maximum permissible engine speed (thereby to prevent engine over speed as discussed above in relation to an exemplary embodiment), a minimum permissible engine speed, a permissible engine speed range, or any combination thereof. A requirement to limit engine speed may arise in various circumstances, not only in relation to a requirement to protect an engine from damage which could be sustained during overly high speed operation. By way of example, there may be a requirement to limit the overall speed of a vehicle or craft being powered by the engine. As another example, there may be a requirement to limit engine speed when the engine is operating under certain conditions, such as in a "limp home mode". As a still further example, there may be a requirement to limit engine speed according to varying conditions to which the engine might be exposed during operation, such a varying barometric pressure (atmospheric pressure) arising through variations in altitude. Further, there may be a speed profile against barometric pressure, in which maximum permissible engine speed varies with altitude and/or minimum permissible engine speed varies with altitude.

The foregoing disclosure is intended to explain how to fashion and use the particular embodiments described, rather than to limit the true, intended, and fair scope and spirit of the present disclosure. The foregoing description is not intended to be exhaustive, nor to be limited to the precise forms disclosed.

It should be appreciated that various modifications can be made without departing from the principles described herein. Therefore, the principles should be understood to include all such modifications within its scope.

While embodiments described herein were primarily developed and are discussed in relation to an internal combustion engine applicable for a UAV, it should be understood that the principles described herein may have application to various other vehicles, machines, apparatus and devices having internal combustion engines using a gas-assist fuel delivery system. Such internal combustion engines may comprise engines in either single-cylinder or multi-cylinder configurations. Further, the engines may be either spark-ignition engines or compression-ignition engines, as well as both two-stroke and four-stroke engines.

The terminology used herein is for the purpose of describing particular example embodiments only and is not intended to be limiting.

As used herein, the singular forms "a", "an" and "the" may be intended to include the plural forms as well, unless the context clearly indicates otherwise.

The method steps, processes, and operations described herein are not to be construed as necessarily requiring their performance in the particular order discussed or illustrated, unless specifically identified as an order of performance. It is also to be understood that additional or alternative steps may be employed.

Reference to any positional descriptions, such as "top", "bottom" and "side", are to be taken in context of the embodiments described (and depicted in the drawings in the case of the first embodiment), and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Furthermore, in embodiments described herein (including the following claims), the word "determining" is understood to include receiving or accessing the relevant data or information.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

The invention claimed is:

1. A method of controlling operation of an internal combustion engine, the method comprising: providing, providing for operating the engine, a first mode for controlling engine speed and a second mode for controlling engine speed; operating the engine in the first mode of operation; and receiving a request for an output speed of the engine to be modified, the request being made by way of a flight control system; wherein the engine is permitted to operate in the first mode with the engine speed requested by the flight control system if the request complies with a predetermined threshold or level; and wherein operation of the engine is changed from the first mode of operation to the second mode of operation following a determination that the output engine speed requested to be modified is beyond the predetermined threshold or level; wherein the first and second modes for controlling the engine speed are different from each other and are selected from the group consisting of demand engine load control and closed loop engine speed control.

2. The method according to claim 1 further comprising reverting control of operation of the engine from the second mode to the first mode once the requested output engine speed is no longer beyond the predetermined threshold or level.

3. The method according to claim 1 wherein the change in operation of the engine following the determination comprises adjusting one or more operational characteristics of the engine speed to or toward respective predetermined threshold(s) or desired level(s).

4. The method according to claim 1 wherein the change in operation of the engine following the determination comprises limiting the output engine speed to about the predetermined or desirable engine speed limit, or controlling the engine speed so that it does not substantially depart from the predetermined or desirable engine speed limit.

5. The method according to claim 1 wherein the flight control system comprises a first controller, and a second controller arranged to interact with an electronic control unit (ECU), whereby in the second mode the ECU precludes the second controller from causing a change which is beyond the predetermined threshold or level.

6. The method according to claim 5 wherein the first controller is external of the engine and the second controller is local to the engine.

7. The method according to claim 6 wherein the ECU is arranged with the second controller in a closed loop configuration for operation when a control strategy is performed by the method.

8. The method according to claim 7 wherein the output engine speed is controlled by way of the operation of a throttle, the throttle being operable under control of the ECU.

9. The method according to claim 1 wherein the output engine speed is controlled by way of the operation of a throttle.

10. The method according to claim 9 wherein the output engine speed is controlled by way of a position of the throttle, the position of the throttle being controllable by way of:
(i) a first controller external or remote of the engine, and/or,
(ii) a second controller local or proximate to the engine.

11. The method according to claim 10 wherein the first and second controllers are arranged in communication with an electronic control unit (ECU) of the engine.

12. The method according to claim 11 wherein the ECU is arranged with the second controller in a closed loop configuration for operation when a control strategy is performed by the method.

13. A control system for an internal combustion engine, wherein the control system is operable to provide, for operating the engine, a first mode for controlling engine speed and a second mode for controlling engine speed, and wherein the control system comprises a first controller external of the engine and a second controller local to the engine, the first controller being configured to request an output engine speed in the first mode, the second controller being configured to interact with an electronic control unit (ECU), wherein the engine is permitted to operate in the first mode with the output engine speed requested by the first controller if the request complies with a predetermined threshold or level, and wherein in the second mode the ECU precludes the second controller from causing a change in output engine speed which is beyond the predetermined threshold or level; wherein the first and second modes for controlling engine speed are different from each other and are selected from the group consisting of demand engine load control and closed loop engine speed control.

14. The control system according to claim 13 wherein control of operation of the engine reverts from the second mode to the first mode once the requested output engine speed is no longer beyond the predetermined threshold or level.

15. An internal combustion engine operated in accordance with the method according to claim 1.

16. An internal combustion engine having a control system according to claim 13.

17. A vehicle powered by the internal combustion engine according to claim 15.

18. The vehicle according to claim 17 configured as a remotely operable unmanned aerial vehicle (UAV).

19. A vehicle powered by the internal combustion engine according to claim 16.

20. A control system for an internal combustion engine, wherein:
the control system is operable, for operating the engine, to provide a first mode for controlling engine speed and a second mode for controlling the engine speed; the control system comprises a first controller external of the engine and a second controller local to the engine; the first controller configured to request an output engine speed of the engine in the first mode; the second controller is configured to interact with an electronic control unit (ECU); the engine is permitted to operate in the first mode with the output engine speed requested by the first controller if the request complies with a predetermined threshold or level; the second controller is operable to change operation of the engine from the first mode to the second mode following a determination that the output engine speed has been requested to be beyond the predetermined threshold or level; and in the second mode the ECU is operable to preclude the second controller from causing a change in the output engine speed of the engine which is beyond the predetermined threshold or level; wherein the first and second modes for controlling engine speed are different from each other and are selected from the group consisting of demand engine load control and closed loop engine speed control.

21. The control system according to claim 20 wherein control of operation of the engine reverts from the second mode to the first mode once the requested output engine speed is no longer beyond the predetermined threshold or level.

* * * * *